United States Patent [19]
Shapiro et al.

[11] 3,909,790
[45] Sept. 30, 1975

[54] MINICOMPUTER WITH SELECTOR CHANNEL INPUT-OUTPUT SYSTEM AND INTERRUPT SYSTEM

[75] Inventors: Allen L. Shapiro, Santa Ana; Douglas T. Sherwood, Costa Mesa; Shelton A. Foster, Anaheim, all of Calif.

[73] Assignee: Omnus Computer Corporation, Santa Ana, Calif.

[22] Filed: Aug. 25, 1972

[21] Appl. No.: 283,640

[52] U.S. Cl. .......... 340/172.5
[51] Int. Cl.[2] .......... G06F 9/18
[58] Field of Search .......... 340/172.5

[56] References Cited

UNITED STATES PATENTS

| | | | |
|---|---|---|---|
| 3,425,037 | 1/1969 | Patterson et al. | 340/172.5 |
| 3,512,136 | 5/1970 | Harmon et al. | 340/172.5 |
| 3,573,741 | 4/1971 | Gavril | 340/172.5 |
| 3,673,576 | 6/1972 | Donaldson, Jr. | 340/172.5 |
| 3,680,053 | 7/1972 | Cotton et al. | 340/172.5 |
| 3,680,054 | 7/1972 | Bunker et al. | 340/172.5 |
| 3,688,271 | 8/1972 | Rouse | 340/172.5 |
| 3,693,161 | 9/1972 | Price et al. | 340/172.5 |

*Primary Examiner*—Gareth D. Shaw
*Assistant Examiner*—John P. Vandenburg

[57] ABSTRACT

A single buss minicomputer for use in a data processing system including a plurality of input-output devices. In the first part of the invention, execution of a special instruction by the computer enables a designated one of the input-output devices and connects it to the system to either transmit or receive data. All subsequent communications to and from the computer are with the designated device until the special instruction is again executed, enabling a different input-output device. The special instruction may originate from within the computer memory in a stored program or may be inputted to the system from one of the input-output devices via an interrupt system, the second part of the invention. The interrupt system allows any of the input-output devices to notify the minicomputer when servicing of any kind is required. Following an interrupt priority determination, the interrupting input-output device is connected to the system until a subsequent higher priority interrupt is received, the interrupt servicing is completed or a special connect instruction is executed to enable a different input-output device. A most important aspect of the interrupt system of this invention is that the interrupting input-output device can input instructions directly to the minicomputer. Via the interrupt system, then, any input-output device can input instructions directly to the instruction register of the central processing unit for execution.

19 Claims, 10 Drawing Figures

MINICOMPUTER WITH SELECTOR CHANNEL INPUT-OUTPUT SYSTEM AND INTERRUPT SYSTEM

BACKGROUND OF THE INVENTION

This invention relates to electrical communication devices and, more particularly, to data processing systems having a plurality of connected input-output devices.

The data processing system of this invention includes a minicomputer. Many different definitions of minicomputers have been formulated. Generally, they have been defined by their price rather than performance or descriptive specifications. Today, an average price definition is that minicomputers are those computers having a minimum system cost of $20,000 or less. While some general differences may be found between most large computers and most minicomputers, they are quite similar in design, operation and use. Accordingly, the word "minicomputer," as used herein, is intended to be descriptive rather than limiting in any way. The invention herein may be utilized in a system including a computer of any size.

In most minicomputers, one of two types of system architecture is used. In the first type, termed multiple-buss, a plurality of busses interconnect memories, registers, arithmetic units and other key elements. In the second type, termed single-buss, all key elements of the computer are attached to a single uni-directional input buss and a single uni-directional output buss or to a single bi-directional input-output buss. The minicomputer of this invention belongs to the second type, the single-buss design. While the description of this invention will involve the single-buss design of the preferred embodiment, the invention may be used in either of the two types of minicomputer architecture referred to.

Programmed Data Transfer

In any data processing system including a computer, data transfers between the computer and input-output devices in the system are generally one of two types. In a system including a large computer, automatic data transfers are utilized. An automatic data transfer is initiated by an input-output instruction and is controlled by special input-output processors which are part of the hardware system. In a minicomputer system, on the other hand, data transfers between the computer and input-output devices are programmed data transfers. In a programmed data transfer, each input-output operation is controlled by the computer's timing and control system as a result of an executed input-output instruction. Accordingly, in a programmed data transfer, each input-output operation takes place as a result of a discrete input-output instruction rather than as part of a sequence automatically controlled by a hardware controller. Also, in an automatic data transfer, data transfers may be taking place at the same time as the execution of other instructions by the computer. In a programmed data transfer, of course, no other instruction may be executed concurrently with the execution of the instruction-controlled data transfers.

This invention, therefore, will be described in terms of its use in a preferred embodiment comprising a single-buss minicomputer connected in a system including a plurality of input-output devices. All transfers of data between an input-output device in the system and the minicomputer are programmed data transfers. The invention may be used in other computer embodiments, however, as, for example, in a large scale computer connected to a plurality of input-output devices.

In existing multiple-buss and single-buss minicomputers, an instruction which results in transfer of data between the computer and an input-output device includes at least three parts: a first part designating the type of transfer; a second part designating which input-output device is to be involved; and, a third part designating the location in the computer memory which is to receive the data or from which the data is to be obtained.

There are two considerable disadvantages to the three-part word format currently necessary to transfer data in a programmed data transfer. Firstly, every word transferred to or from a single input-output device is transferred by a separate instruction containing an identical part, the designation of the input-output device involved. As a result, more bits must be used in an input-output instruction, which takes up computer core space and decreases the size of the set of possible input-output instructions. If a single word is transferred at a point in a program, the disadvantage is small. If, however, many different transfers are controlled sequentially to or from a single input-output device, the disadvantages becomes very considerable. For example, if hundreds of data words are transferred to a Teletype, it is necessary to check the status of the device, transfer data words and control words, test for errors in transfer, and so forth. Each such step requires a discrete input-output instruction. Under the methods currently in use, each instruction would contain a redundant part, the identification of the Teletype. Not only does the redundant part occupy a part of core, it reduces the number of input-output instructions for the Teletype and other input-output devices.

The second disadvantage is found in the programming effort necessary in existing minicomputers utilizing program data transfers. Since each data transfer instruction in a programmed data transfer must identify the input-output device involved, the program must either have a different transfer instruction for each input-output device which will be involved in a data transfer or a second program for changing the input-output instructions in the first. In a system including hundreds of input-output devices, then, hundreds of different instructions would have to be included in the program to obtain the same data transfer in each device or an entirely different second program would have to be loaded into core. Either way, the programming time is increased and additional core space must be utilized.

Computer Interrupt System

The interrupt system of current computers allow external events or devices to interrupt a computer program currently being executed and transfer control to a program for servicing the interrupting device. For example, a process computer may be in a system which require it to perform mathematical computations and also to output corrective data to an external device, such as a flow valve, if a deviation from normal values is detected by the external device. If the external device detects such a deviation while the computer is performing calculations under control of an arithmetic program, it may be allowed to interrupt execution of the program and begin an interrupt servicing routine.

Generally, the computer stores, for later recall, its exact point in the calculations and transfers control to a special program for controlling the interrupting device. After the interrupting device is serviced, control is transferred back to the arithmetic program which begins at the point it was interrupted.

In current systems, then, interrupts provide the capability of saving the current execution location of the program and initiating execution of an interrupt program. Other commonly employed features provide the capability of saving the status associated with the computer program and establishing, usually with a hardware system, a priority among the different interrupting devices.

A most important characteristic of all prior and current interrupt systems is that all of the interrupt programs are contained in the computer memory and, therefore, all instructions executed by the computer central processing unit are derived from the computer memory. An interrupt which is acted upon simply changes the address in the memory from which computer instructions are obtained. After an interrupt, then, a computer continues to execute program instructions, but from a different location in memory.

The disadvantage of the current interrupt schemes is that the stored instructions must cause an external event or device to be tested and a different set of instructions executed as a result of the test. Further, if the test indicates that a different set of instructions is to be executed, as explained above, the current status of the computer, address of the next instruction, and so forth, must be saved. Following servicing of the interrupt, the prior status information must be retransferred to the program register, status register, instruction register, and so forth, before the prior program can begin. A result of the many transfers and retransfers of program information and repeated tests for interrupts is that real-time operation of the system is impaired. Substantial amounts of time are taken up by the testing and "house-keeping" tasks which cannot be devoted to real-time operation.

SUMMARY OF THE INVENTION

In accordance with the first part of this invention, provision is made for programmed data transfers in a computer system without the designation of the input-output device involved in each input-output data transfer instruction. A special instruction, termed a "connect instruction," causes a designated input-output device to be connected to the system and enabled. At the same time, all other input-output devices are disconnected from the system and disabled. All subsequent data transfers take place between the computer and the designated input-output device until a further connect instruction is executed, which enables a different input-output device.

As a result, the disadvantages described above in systems utilizing programmed data transfers are not present in this invention. After an input-output device is designated in a connect instruction, no subsequent transfer instruction must identify the input-output device. Accordingly, the second instruction part described above is deleted in all subsequent instructions. The vacated part may be deleted entirely from the instruction word, thereby shortening the instruction length and saving core space. Or, the vacated part may be used to construct a larger input-output instruction set. The latter result is thought to be particularly advantageous and is the result obtained in the preferred embodiment of this invention.

Moreover, the program is transparent as to which input-output device is involved in a programmed data transfer. That is, the program input-output instructions are universal to all input-output devices since no particular device need be designated. Accordingly, the identical data transfer instruction may be used to transfer data between the computer and all similar input-output devices.

In accordance with the second part of this invention, an interrupt system is provided which allows instructions to be transferred directly to the computer from an external device. As a result, instructions constituting an interrupt program may be inputted directly from the interrupting device.

This obviates the need for the external event or device testing steps described above. Moreover, the second part of this invention obviates the need to transfer the current content of the program register and the arithmethic registers. As a result, a further important improvement in real-time operation is achieved.

DESCRIPTION OF THE PREFERRED EMBODIMENT

Figure 1:
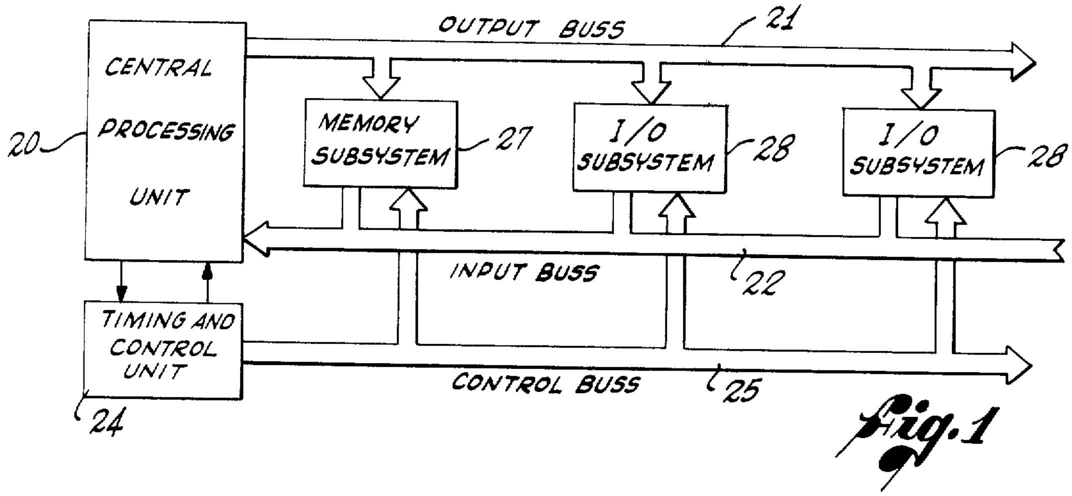
FIG. 1 is a block diagram of the overall single buss minicomputer system of this invention, including the memory subsystem and two of the plurality of input-output subsystems which may be controlled by this invention.

As explained above, this invention has been utilized in its preferred embodiment in a minicomputer of single buss architecture. Referring to FIG. 1, a central processing unit 20 delivers data on an output buss 21 and accepts data on an input buss 22. The central processing unit, except for the portions discussed in detail herein, is of typical central processing unit design. It consists of general registers, an arithmetic unit, a program counter and an instruction register. A timing and control unit 24 controls the operation of the central processing unit and the remaining part of the system via a set of control lines on a control buss 25, as is well known.

All elements in the data processing system are connected to the input, output and control busses. Any data word outputted by the central processing unit, therefore, is presented to all other elements in a system connected to the output buss at the same time. In the general case, data is directed to a single element by the timing and control unit 24. For example, as will be explained in connection with FIG. 3, a word is stored in the memory subsystem 27 by placing it on the output buss 21 and turning on the proper control lines in the control buss 25. Taken together, the input, output and control busses form the "single buss" architecture referred to above.

In the preferred embodiment, the word length is 16 bits. There are, then, 16 lines in the input buss and the output buss. There are, in the preferred embodiment, 32 control lines and one clock line in the control buss, a total of 33 lines. The single buss, therefore, consists of 65 lines in the preferred embodiment.

As will be explained in detail, one part of this invention involves a system and method for transferring data between the central processing unit 20 and one of a plurality of input-output subsystems 28. While two input-output subsystems are illustrated in FIG. 1, it should be understood that many hundreds of such input-output subsystems may be present in an actual data processing system in which this invention is utilized.

The type of input-output subsystems connected to the system including this invention may also vary. For example, a single input-output device may be a Teletype, video terminal, card reader, line printer, process controller, another computer, and so forth.

Figure 2:
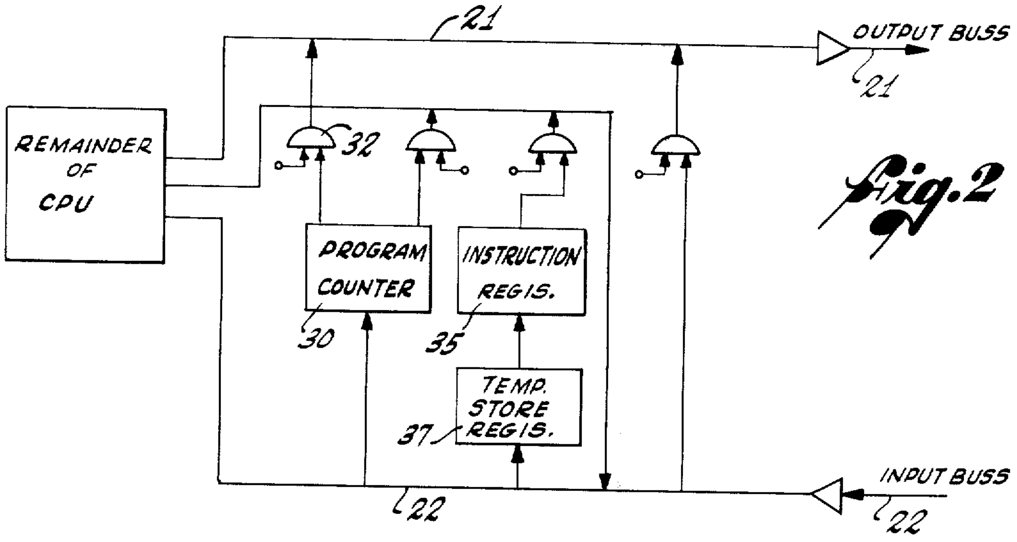
FIG. 2 is a block diagram of the central processing unit of the minicomputer of this invention, showing certain of the registers necessary to an understanding of this invention.

A portion of the central processing unit of the preferred embodiment is illustrated in FIG. 2. The central processing unit design is that of a typical minicomputer of the single buss architecture type. A program counter 30 contains, as in the usual case of a stored program computer, the address in memory in which the next instruction will be found. To initiate the next instruction cycle, the content of the program counter is gated onto the central processing unit output buss 21 via AND gate 32 and is used to address the location in the core memory unit of the desired instruction. The program counter is then stepped to the address of the following instruction.

An instruction register 35 contains, at any given time, the instruction currently being executed by the minicomputer. The instruction contained in the instruction register 35 is interpreted, in well known fashion, by the timing and control unit 24 (FIG. 1) which controls the steps required by the instruction by turning on the appropriate lines in the control buss 25.

As with most stored program computers, each instruction interval controlled by the central processing unit consists of two cycles. The first, termed the instruction fetch cycle, is initiated on the first clock interval following completion of the execution of the previous instruction. An example of the two-cycle instruction interval will be given in connection with transfer from the core memory unit of the next instruction to be executed. To initiate a memory fetch cycle, the content of the program counter 30, which is the address of the next instruction, is gated onto the central processing unit output buss 21. At the same time the address is placed on the output buss, a control line in the control buss turns on, causing the memory to be accessed at the address appearing on the output buss.

The content of the memory at the address specified is read out of core onto the input buss 22 where it is stored in a temporary storage register 37. Storage of the new instruction in the temporary register 37 is the end of the instruction fetch cycle of the instruction interval.

The second cycle of an instruction interval is termed the instruction execution cycle. During the next clock interval after the end of the instruction fetch cycle, the content of the temporary storage register 37 is loaded into the instruction register 35, beginning the instruction execution cycle. To perform the instruction execution cycle, the timing and control unit interprets the content of the instruction register and turns on the appropriate control lines in the control buss 25.

Figure 3:
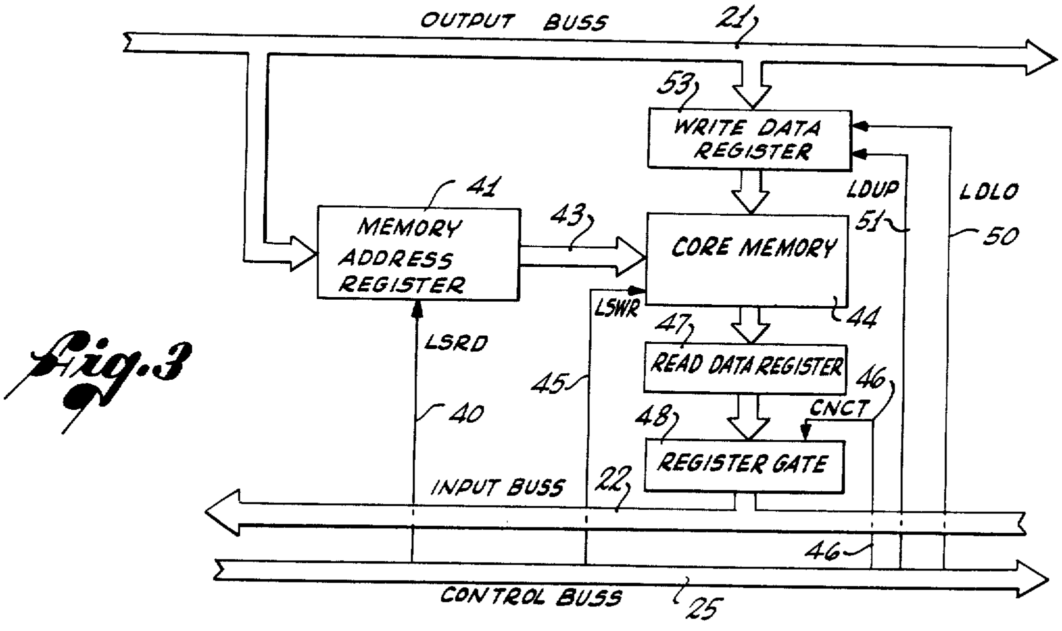
FIG. 3 is a detailed block diagram of the memory subsystem of FIG. 1.

Operation of the memory subsystem 27 (FIG. 1) and the steps of an instruction interval may be better understood by reference to FIG. 3, a detailed block diagram of the memory subsystem. As explained above, the address of the memory location to be accessed is gated onto the output buss of the central processing unit. At the same time, the timing and control unit turns on LSRD (Low Speed Read) line 40. This causes the content of the output buss (the address) to be loaded into a memory address register 41. When the memory address register 41 is loaded, a set of register output lines 43 turn on and address the appropriate cores in a core memory unit 44.

In a following clock cycle, the timing and control unit turns on two further control lines, the LSWR (Low Speed Write) and CNCT (Connect Memory to Buss) lines 45, 46. The LSWR line 45 causes the contents of the portion of the core memory unit 44 addressed by the memory address register output lines 43 to be read out to a register gate 48 via a read data register 47. CNCT line 46 controls the register gate 48 to open, placing the addressed data onto the central processing unit input buss 22.

In similar fashion, a data word is loaded into the core memory 44 by placing it on the central processing unit output buss 21. The timing and control unit turns on first the LDLO (Load Lower Byte) line 50, causing the least significant eight bits of the data word to be loaded into the write data register 53. The LDUP (Load Upper Byte) line 51, similarly, causes the most significant eight bits to be loaded into the write data register 53. The write data register content is loaded into the portion of the core memory unit 44 at the address specified by the memory address register 41 when the timing and control unit turns on the LSWR line 45.

Figure 8:
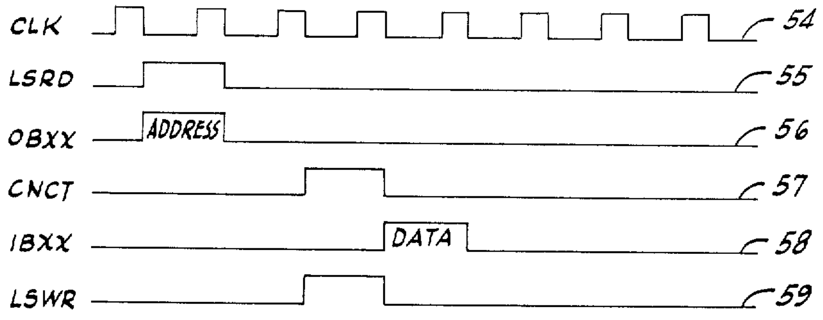
FIG. 8 is a timing diagram of the control signals and data line signals for reading an instruction or data word from the memory subsystem of FIG. 3.

The exact timing of a memory read cycle may be seen in FIG. 8. Referring to that figure, line 54 is the system clock signal, a five megahertz signal in the preferred embodiment. As explained in connection with FIG. 3, the timing and control unit turns on the LSRD control signal 55 when the address 56 of the next instruction (or data) appears on the output buss lines OBXX (OB00 to OB15). After one clock interval, the CNCT and LSWR lines 57, 59 turn on, reading the data word 58 onto the input buss line IBXX (IB00 to IB15) during the next clock interval.

While the operation of the memory subsystem 27 of FIG. 1 has been explained in terms of retrieval of a program instruction, it should be understood that ordinary data words are addressed and retrieved from the core memory unit in the same fashion.

Programmed Data Transfers

Figure 4:
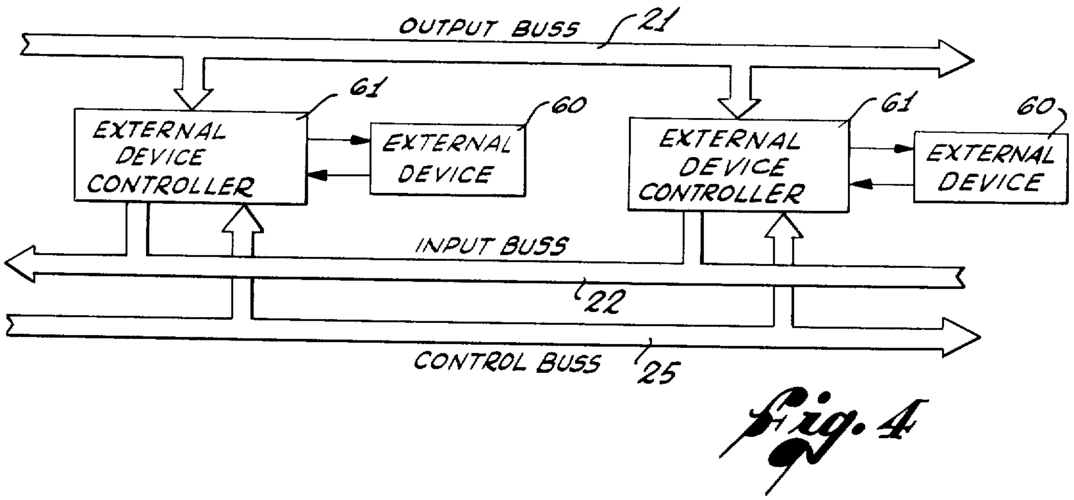
FIG. 4 is a block diagram of the input-output subsystem of FIG. 1, illustrating the external device controllers and controlled external devices and the relationship of the external device controllers to the input, output and control busses.

As explained in connection with FIG. 1, a data processing system in which this invention is utilized may have many hundreds of input-output subsystems connected to the input, output and control busses. Referring to FIG. 4, two such input-output subsystems are illustrated. In accordance with this invention, each input-output device 60, or external device, in the system is connected to the busses by an external device controller 61. It is the functions of each external device controller 61 to serve as an interface between the system and the connected external device 60, to enable external devices for transmitting data as ordered by the timing and control unit and to communicate interrupt signals, data and instructions from the external devices to the central processing unit input buss.

Figure 5:
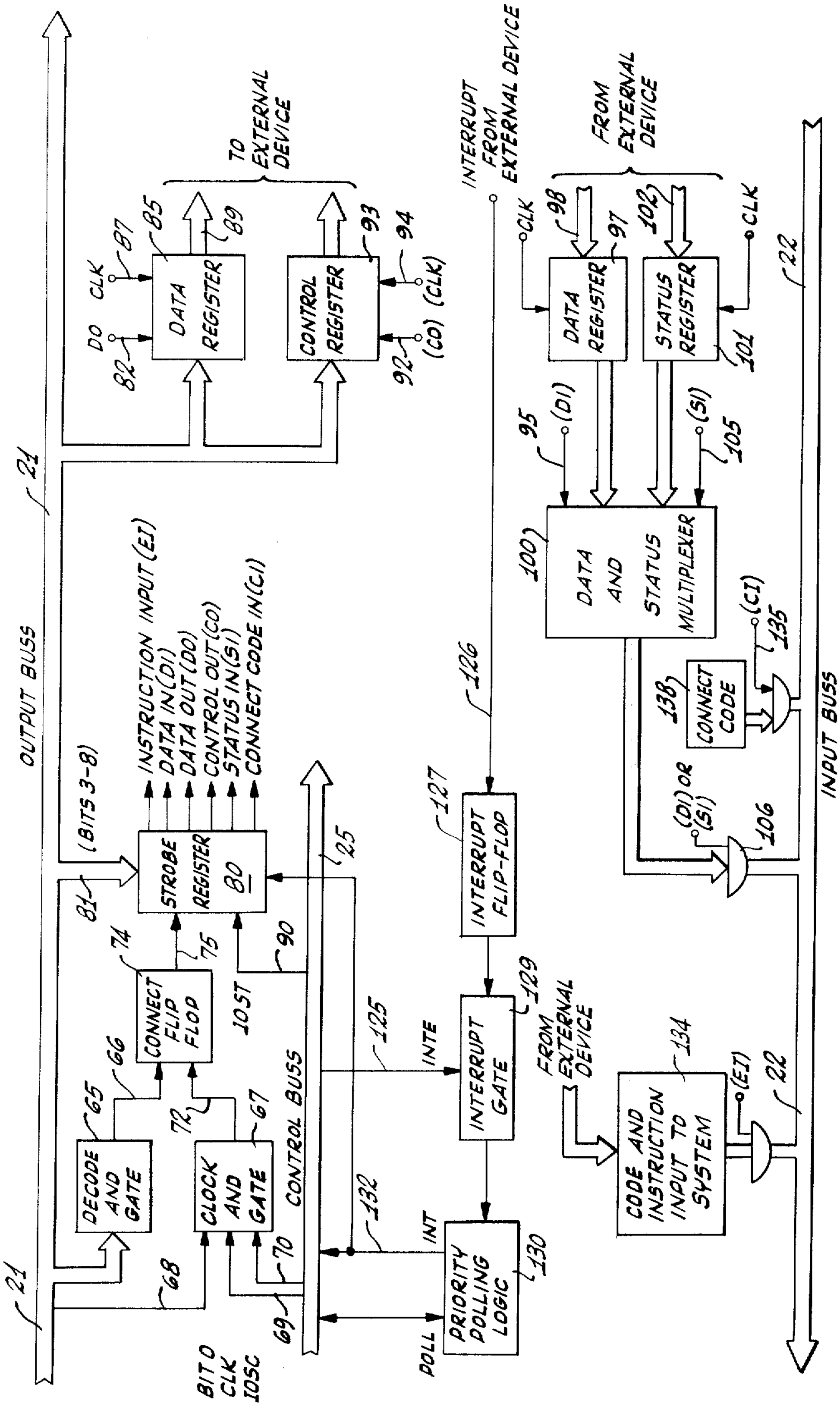
FIG. 5 is a detailed block diagram of one of the external device controllers of FIG. 4.

Referring to FIG. 5, a detailed block diagram of the external device controller of FIG. 4 is shown. The operation of a connect instruction, the first part of the invention herein, will be explained in detail first, to be followed by an explanation of the interrupt system, the second part of this invention.

It has been explained how the system of this invention retrieves instructions from the system memory unit. In prior minicomputer systems, if the retrieved instruction required the transfer of data to or from an input-output device, the instruction would have the three part format described previously, including a part identifying the input-output device. In the practice of this invention, an input-output device is identified and enabled by a single special instruction, termed a connect instruction, as will be described.

As is readily understood, the format of the instructions may vary. In the preferred embodiment, the format of the connect instruction, a sixteen bit word, is as follows: bit zero is zero; bit one is one; bits three to ten contain a code uniquely identifying one input-output device; and, bits twelve to fifteen are zero. When the timing and control unit decodes the instruction in the instruction register 35 of FIG. 2 and finds the above bit format, a connect instruction is executed during the execution cycle of the instruction interval.

In the execution of the connect instruction, the instruction itself is placed on the output buss 21 and, thereby, delivered to all input-output devices. Referring to FIG. 5, each external device controller has a decode AND gate 65 to which output buss lines 3 to 10 are connected as inputs.

Each decode AND gate 65 in each external device controller is wired to turn on its output line 66 only when the code appearing on the output buss lines match the identification code assigned to the external device connected to the controller.

A second part of the device code detection is performed by a clock AND gate 67. The clock AND gate 67 is provided with three inputs: the zero bit line 68 from the output buss (OB00); the system clock signal line 69; and a strobe line (IOSC) (Input-Output Connect Strobe) 70. If proper signals appear on the three input lines to the clock AND gate, the gate output line 72 turns on.

The output lines 66, 72 from both recognition gates 65, 67 are applied to a connect flip-flop 74. The connect flip-flop is a D-type, that is, its output is set to the state of input line 66 whenever input line 72 is turned on. The connect flip-flop and its inputs will be explained in greater detail in connection with the discussion of FIG. 6. For the purpose of the discussion of FIG. 5, however, it is sufficient to understand that the output line 75 of the connect flip-flop turns on only when there is a coincidence of the unique device code on lines 3 to 10 of the output buss, a zero level on the output buss zero line, a clock cycle and the IOSC 70 line being turned on.

The clock AND gate 67 of every external device controller, of course, turns on its output line 72 at the same time, since they all have the same inputs. For the one external device controller, however, having its unique code on lines 3 to 10 of the output buss, the connect flip-flop output line 75 assumes the state of its input line 66 and turns on. All other connect flip-flops and the other external device controllers assume the states of their input lines 66 and turn off. Until a subsequent connect instruction is executed, the connect flip-flops remain in the state to which they are set.

As a result of the execution of a connect instruction, then, the designated external device controller is set with its connect flip-flop line 75 on, which completes the connect sequence. Each subsequent input-output instruction from the memory device causes, inter alia, a one-bit word to appear on lines 3 to 8 of the output buss and the IOST line to turn on simultaneous. Lines 3 to 8 are applied to a strobe register 80 in each of the external device controllers via lines 81. In the preferred embodiment of this invention, the single input-output instruction may contain more than one operation causing the above sequence to be repeated during execution of the single instruction.

The strobe register 80 turns on one of its output lines when its input connect flip-flop 75 of the IOST (Input-Output Transfer Strobe) line 90 turn on. The output line turned on by the strobe register 80 is determined by which one of the output buss lines 3 to 8 is on when the IOST line 9 turns on. The IOST line is one of the control buss lines operated by the timing and control unit.

The one bit word on output buss lines 3 to 8 serves to set the proper logic lines in the external device controller, depending upon which bit is on, according to the following schedule:

1. Line 3 on: External device controller logic line (EI) is turned on to allow one instruction to be placed on the input buss to the central processing unit by the external device;
2. Line 4 on: External device controller logic line (DI) is turned on to allow data to be placed on the input buss 22 by the external device;
3. Line 5 on: External device controller logic line (DO) is turned on to allow data to be delivered to the connected external device from the output buss 21;
4. Line 6 on: External device controller logic line (CO) is turned on to allow control data to be delivered to the connected external device from the output buss 21;
5. Line 7 on: External device controller logic line (SI) is turned on to allow data containing the status of the external device to be placed on the input buss 22; and, 6. Line 8 on: External device controller logic line (CI) is turned on to allow the connect code to be placed on the input buss 22 by the external device.

It is an important part of this invention that when the external device controller connect flip-flop line is set, it remains set until a further connect instruction is executed. The output lines of the strobe register 80 remain set for a single clock time to determine the type of input-output transfer to be made. If the logic line to deliver data to the input buss (DI) is set, for example, all data words outputted from the external device will be placed on the input buss and delivered to the central processing unit. In this fashion, as explained above, programmed data transfers may be executed without the efficiency-lessening requirement of identification of the external device in every transfer instruction.

In those instances in which it is desired to deliver data to an external device from the central processing unit or the system memory unit, a connect instruction is executed, as explained. The (DO) logic line 82 of the external device controller, connected to a data register 85, is turned on. The data word received will then be loaded into the external device data register 85. When the next clock signal is received, contents of the data register 85 are stepped out to the external device via external device input lines 89. If it is desired to switch from data words to a control word for the external device, the timing and control unit turns on the control buss IOST line 90 to the strobe register 80. The next one bit word received (line 6 on) would turn on the external device controller (CO) logic line for one clock cycle. The next word transferred to the external device controller would perform the desired control step.

In this way, different functions of an external device can be controlled without executing a further connect instruction. An example of this is found in the delivery of data to a Teletype. In order to output data from either the central processing unit or the memory units, a connect instruction turns on the connect flip-flop of the external device controller of the designated Teletype. A number of data words could then be sent on the output buss, resulting in alphanumeric characters being printed by the Teletype. If a margin or tabulation function was desired for entering of title lines, for example, the timing and control unit would then turn on the IOST line 90 to the strobe register and line 6 of the output buss. The (CO) line 92 is turned on for one clock cycle and the control word stepped through the external device controller register 93. In this way, pages of material are printed by a line printer or Teletype without specifying which external device would be involved after the execution of a single connect instruction.

It may be easily seen, then, from the above, how data and control words are delivered to an external device from the minicomputer's central processing unit or memory unit. In addition, an external device may deliver data words to the central processing unit or report its status to the central processing unit.

If line 4 of the output buss is turned on when the IOST line 90 is turned on by the timing and control unit, the external device controller turns on the (DI) logic line 95 to accept data from the external device. Data words are transferred through external device output data register 97 from lines 98 to a data and status multiplexer 100.

Similarly, status words from the external device relating to its status are transferred through external device status register 101 to he data and status multiplexer 100. If the strobe register 80 had turned on the (DI) logic line 95, the data and status multiplexer would load the data words into buss register 104. If the strobe register 80 had turned on the (SI) logic line 105, the data and status multiplexer would load the status words onto the input buss register 104. In either case, the register contents are gated onto the input buss through AND gate 106 by either the (DI), or (SI) logic lines.

From the above, then, one can readily understand the programmed data transfer steps of this invention. After a connect instruction is executed by the timing and control unit, the designated external device is connected to the system until a further connect instruction is received. In the preferred embodiment, a most important result is that a much larger input-output instruction set may be provided within the restriction of a 16-bit word since each input-output instruction need not specify the external device to be involved in the execution of the instruction.

Figure 6:
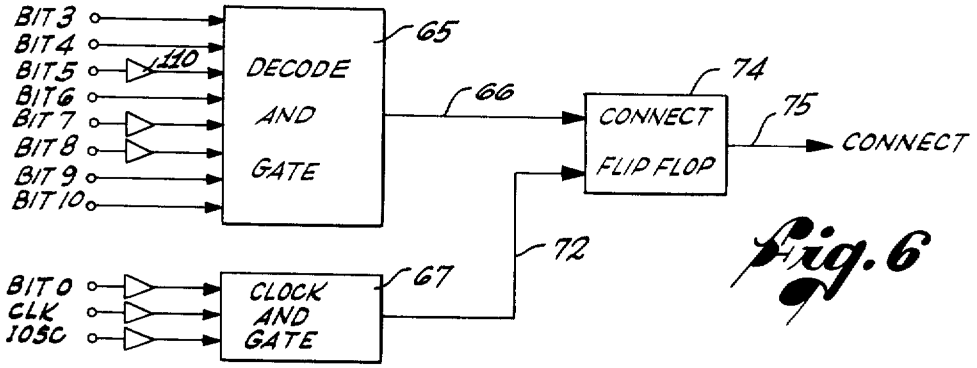
FIG. 6 is a detailed block diagram of the decode and clock gates which control the connect flip-flop of FIG. 5.

Before turning to the second part of this invention, the interrupt system, the detailed diagram of the connect flip-flop circuitry and accompanying timing diagram will be discussed. Referring to FIG. 6, the decode AND gate 65 is shown with eight inputs, lines 3 to 10 of the output buss. The AND gate will only turn on its output line 66 if all of its immediate inputs are at the binary one level. By selectively including inverters, such as inverter 110, the necessary bit configuration on the output buss lines 3 to 10 to operate the gate are determined. In the example of FIG. 6, the AND gate 65 would turn on its output line 66 if a binary word of 11001011 (203) appears on the output buss line. The code assigned to that external device, then, is decimal number 203.

Connect flip-flop 74 is a D-type, so its output line assumes and remains in the state of input line 66 whenever clock AND gate 67 turns on its output line 72. If the proper code had appeared on output buss lines 3 to 10, connect flip-flop output line 75 would turn on when clock AND gate output line 72 turns on.

Figure 9:
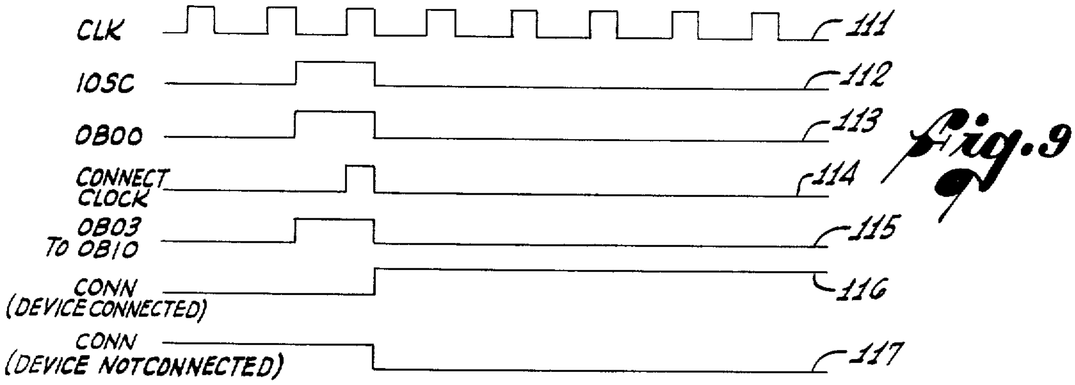
FIG. 9 is a timing diagram of the control lines and connect line signals of FIG. 5.

The timing diagram for the execution of a connect instruction is shown in FIG. 9. The clock signal, having a frequency of 5 megahertz in the preferred embodiment, is shown in line 111. The IOSC control line signal 112 and the output buss zero line (OB00) 113 are ANDED with the clock signal to produce the connect clock signal 114 on connect flip-flop output line 75 (FIGS. 5 and 6). As in all AND gates, the connect clock signal 114 is on for a length of time determined by the shortest input, the clock signal in this case. The external device code bits which would appear on output buss lines 3 to 10 are shown at signal line 115 (OB03 to OB10). When the proper output buss lines coincide with the connect clock, the flip-flop is set as shown in line 116 and the associate external device is connected to the system. All other connect flip-flops are reset, including the connect flip-flop previously set, as shown in signal line 117.

From the above description, then, it may be readily understood how programmed data transfers may be accomplished by this invention without resorting to the current practice of including the designation of the input-output device involved in every input-output instruction. As a result, an enlarged input-output instruction set is made possible, core spaced saved and the programming process shortened and made easier.

Computer Interrupt System

In accordance with the second part of this invention, each interrupting device outputs an instruction to the computer during the execution of an interrupt sequence. Execution of an interrupt sequence consists of a three-phase cycle occurring during three consecutive instruction intervals.

Referring to FIG. 5, the timing and control unit turns on INTE control line 125 if interrupts from the input-output devices are to be allowed. If line 125 is off, the system ignores interrupt requests from the various input-output devices in the system. If any external device generates an interrupt, the device turns on interrupt line 126 in well-known fashion and sets an interrupt flip-flop 127.

Providing INTE control line 125 is on and, thereby, the interrupt gate 129 open, a polling process is initiated by the priority polling logic 130. The purpose of the polling process is to determine which interrupting device has the highest interrupt priority in the event interrupts from two or more input-output devices occur at the same time. Since the interrupt priority polling hardware is a standard device, no detailed explanation of its operation will be made. It is sufficient to understand that the polling process will identify a single one external device as having the highest present priority after an interrupt. The end of the polling sequence is the end of the first phase of the interrupt sequence execution.

At the start of the next phase, the external device controller (FIG. 5) having the highest priority sets the INT control line 132. Line 132, in addition to being connected to the control buss 25, is also connected to strobe register 80. When INT line 132 is set by the priority polling logic, strobe register 80 is controlled thereby to turn on its first control output line, labled "Instruction Input" (E.I.) in FIG. 5. After the INT line is recognized, the code and instruction input to system unit 134 generates an instruction and outputs it onto the input buss 22 where it is transferred to the computer. The code and instruction input to system unit 134 will be explained in detail in connection with FIG. 7. This instruction is formed in one of four ways.

In the first, a jump-and-save environment instruction is inputted to the computer from the interrupting device. In the system of the preferred embodiment, a jump-and-save environment instruction is an instruction which, as the name implies, transfers control to another program and saves the entire computer environment for a return to the original program. The second phase of the interrupt sequence execution ends with the jump-and-save-environment instruction stored in the temporary storage register 37 (FIG. 2) of the central processing unit.

During the third and last phase of the interrupt sequence execution, the instruction is transferred from the temporary storage register 37 to the instruction register 35 of the central processing unit. There, the instruction is executed by the timing and control unit in usual fashion.

Execution of the jump-and-save-environment instruction causes a four word block in the core memory unit 44 (FIG. 3) to be allocated for storage of register values in the central processing unit. The content of the status register of the central processing unit is placed in the first word storage location. The content of the program counter is placed in the third word storage location.

During the first clock interval of the instruction execution, the IOST control line 90 (FIG. 5) and line 8 of the output buss are turned on. If any connect flip-flop of the system had been set when the interrupt was detected, the strobe register 80 of the associated external device controller will turn on its connect code in (CI) logic line 135. The connect code is a data word specifying the device number of that input-output device. The connect code unit 138 is a hardward device which, when the logic line (CI) 135 is on, outputs its device code onto input buss 22. The connect code is loaded into a special register (not shown) in the central processing unit.

At this point, then, the central processing unit holds both the connect code in a special register and the jump-and-save-environment instruction in the instruction register. From the former, the device code of the previously connected device is available. It will be stored in the second word location of the four word block. From the latter, the device code of the interrupting device is available.

The fourth word of the four word block contains the memory address of the first instruction of the interrupt program. That word is loaded into the instruction register to begin the interrupt program.

The connect flip-flop of the external device controller which generated the interrupt is set in a manner similar to the operation of the connect instruction. From the jump-and-save-environment instruction, the device code of the device which generated the interrupt is available. The timing and control unit then fills in the remainder of the connect instruction and the sequence proceeds as previously described and as shown in the timing diagram of FIG. 9.

Figure 7:
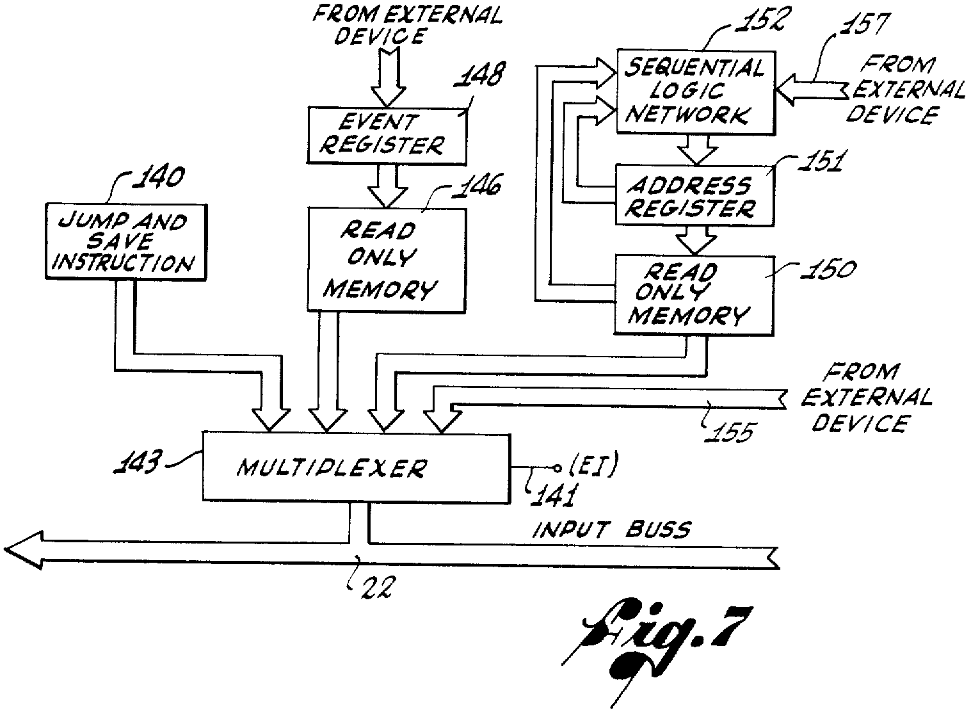
FIG. 7 is a detailed block diagram of the Code and Instruction Input to System block of FIG. 5.

Referring to FIG. 7, a detailed block diagram of the code and instruction input to system unit 134 of FIG. 5 is shown. As explained above, an interrupting input-output device generates, by a hardware unit 140, a jump-and-save-environment instruction. The (EI) line 141 causes the jump-and-save-environment instruction unit 149 to output its instruction via multiplexer 143 to the input buss 22. As previously described, the instruction is loaded into the central processing unit instruction register and executed by the timing and control unit during the third cycle of the interrupt sequence.

When the jump-and-save-environment instruction is inputted to the central processing unit, execution of the instruction causes the interrupting input-output device to be identified and connected to the system via the connect code, as described above. Also, the instruction causes an interrupt program to be begun which services the interrupting input-output device.

The interrupt program can transfer data to and from the connected input-output device as discussed in reference to the connect instruction since the device is connected.

In the second way of inputting an instruction to the computer from an external device, one or more instructions are delivered from the input-output device via a read-only memory 146 at each interrupt. For example, each of the delivered instructions may result from different external events. Events from the external device could specify, via event register 148 which of the stored routines in the read-only memory device 146 are to be executed. This eliminates the need for a long testing routine to be performed on the input-output device.

Thirdly, a combination of the instructions in a read-only memory device 150 and the events detected in the external device by lines 153 could be used to vary the instructions supplied. A sequential logic network 152 operates on the combination of the external input, the current address in address register 151 and the current output from the read-only memory device 150 to form varying sequences of instructions.

Finally, instructions could be generated by an external device and transferred to the central computer via lines 155. The external device may be, for example, a computer operating under its own stored program. It may receive instructions, for example, to perform an arithmetic computation that is, according to predetermined criteria, too complex and which should, therefore, be performed by the central computer. Under control of its own program, it may then form instructions for transfer directly to the central computer via lines 155 and input buss 22.

In these various examples, the instructions are transferred directly to the instruction register of the central computer by the interrupting input-output device. This direct transfer enables the very powerful ability described herein of the transfer of instructions from an input-output device.

Figure 10:
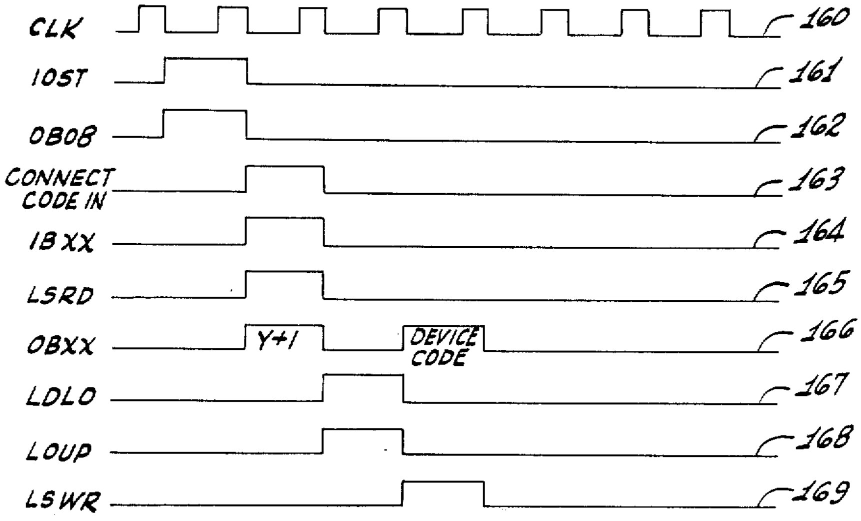
FIG. 10 is a timing diagram of the interrupt control lines and data lines signals involved in an external device interrupt according to this invention.

Referring to FIG. 10, a timing diagram of the timing sequence in storing of the connect code is shown. As in the prior timing diagrams, signal line 160 is the five megahertz clock signal. Prior to the first clock interval, as previously described, an interrupt from one of the input-output devices other than the currently connected device is detected. As a result, during the first clock interval, the timing and control unit turns on the IOST control line signal 161 and line 8 of the output buss 162 for one clock cycle. The strobe register of the currently connected input-output device then turns on its connect code in logic line 163. As explained, the logic line gates the connect code onto lines IBXX 164 of the central processing unit input buss. The connect code, identifying the currently connected input-output device, is loaded into a temporary storage register provided for the purpose in the central processing unit.

The timing and control unit then initiates an operation to load the core memory unit by turning on the LSRD control line signal 165. The LDLO and LDUP control line signals 167, 168 are turned on, causing the connect code to be loaded into the write data register. During the next clock cycle, the LSWR control line signal 169 turns on, loading the connect code in the core memory.

From the description of this invention, it may be readily appreciated that a substantial improvement in the real-time operation of minicomputers has been made.

I claim:

1. In a data processing system in which information units are transferred between a computer in the system and a plurality of input-output devices, the combination comprising computer means, means for transferring units of information to and from said computer means, a plurality of input-output devices, a plurality of controller means, each connected to said transferring means and one of said plurality of input-output devices, each of said controller means comprising means connected to said transferring means for decoding units of information transferred thereby and generating an enabling signal when an information unit having a predetermined content is decoded, register means connected to receive said enabling signal and connected to said transferring means for developing a plurality of control outputs, one of said control outputs being turned on in response to an information unit transferred on said transferring means subsequent to said unit having a predetermined content when the register means is enabled by said enabling signal, a plurality of means for selectively transmitting information units between said means for transferring and the input-output device connected to said controller means, and, means connecting each of said register control outputs to one of said transmitting means for controlling said means to transmit or not transmit information units.

2. The combination of claim 1, wherein said means for transferring units of information comprises bidirectional buss means for transferring data, control and instruction words to and from said computer means.

3. The combination of claim 1, wherein said means for decoding comprises, logic circuit means for determining the presence on said transferring means of an information unit having a predetermined content and for developing a setting output signal in response thereto, and, bistable circuit means for developing an enabling signal in response to said setting output signal.

4. The combination of claim 3, further comprising second logic circuit means connected to said transferring means and to a computer control signal for developing a second setting output signal connected to said bistable circuit means.

5. The combination of claim 1, wherein said register means develops a plurality of outputs for determining whether information units are to be transferred from said computer means to said input-output device or from said device to said computer means.

6. The combination of claim 1, wherein said means for selectively transmitting information units comprises buffer storage means.

7. The combination of claim 1, wherein said means for selectively transmitting information units comprises means for generating program instructions for execution by said computer means.

8. The combination of claim 7, wherein said connecting means comprises gate means controlled by one of said register control outputs for causing program instructions to be transferred to said computer means by said transferring means.

9. The combination of claim 1, further comprising means for generating an interrupt signal from said input-output device connected to said controller means, means connecting said interrupt signal to said register means for controlling said register means to develop an instruction control output, and, means controlled by said instruction control output for generating an instruction information unit for execution by said computer means.

10. The combination of claim 9, further comprising means connecting said instruction information unit to said transferring means.

11. The combination of claim 9, further comprising means for generating an information unit having said predetermined content in response to said instruction information unit.

12. The combination of claim 9, further comprising means connected to all means for generating interrupt signals for determining the priority between interrupts if more than one interrupt signal is generated simultaneously.

13. The combination of claim 1, further comprising means for generating an interrupt signal from said input-output device connected to said controller means, means connecting said interrupt signal to said register means for controlling said register means to develop an instruction control output, means controlled by said instruction control output for generating an instruction information unit for execution by said computer means, means connecting said instruction information unit to said transferring means, and, means for generating an information unit of said predetermined content in response to said instruction information unit.

14. In a data processing system in which information units are transferred between a computer in the system and a plurality of input-output devices, the combination comprising computer means, means for transferring units of information to and from said computer means, a plurality of input-output devices, a plurality of controller means, each connected to said transferring means and one of said plurality of input-output devices, each of said controller means comprising logic circuit means for determining the presence on said transferring means of an information unit of predetermined content and for developing a setting output signal in response thereo, bistable circuit means for developing an enabling signal in response to said setting output signal, register means connected to receive said enabling signal and connected to said transferring means for developing a plurality of control outputs for determining whether information units are to be transferred from said computer means to said input-output device or from said device to said computer means, one of said control outputs being turned on in response to an information unit transferred on said transferring means subsequent to said unit having a predetermined content when the register means is enabled by said enabling signal, a plurality of means for selectively transmitting information units between said means for transferring and the input-output device connected to said controller means, and, means connecting each of said register control outputs to one of said transmitting means for controlling said means to transmit or not transmit information units.

15. The combination of claim 14, further comprising means for generating an interrupt signal from said input-output device connected to said controller means, means connecting said interrupt signal to said register means for controlling said register means to develop an instruction control output, and, means controlled by said instruction control output for generating an instruction information unit for execution by said computer means.

16. The combination of claim 15, further comprising means connecting said instruction information unit to said transferring means.

17. The combination of claim 15, further comprising means for generating an information unit of said predetermined content in response to said instruction information unit.

18. The combination of claim 15, further comprising means connected to all means for generating interrupt signals for determining the priority between interrupts if more than one interrupt signal is generated simultaneously.

19. The combination of claim 14, further comprising, means for generating an interrupt signal from said input-output device connected to said controller means, means connecting said interrupt signal to said register means for controlling said register means to develop an instruction control output, means controlled by said instruction control output for generating an instruction information unit for execution by said computer means, means connecting said instruction information unit to said transferring means, and, means for generating an information unit of said predetermined content in response to said instruction information unit.

* * * * *